(No Model.)
W. W. REYNOLDS.
SCALE FOR WEIGHING ACCORDING TO TWO STANDARDS.
No. 351,528. Patented Oct. 26, 1886.
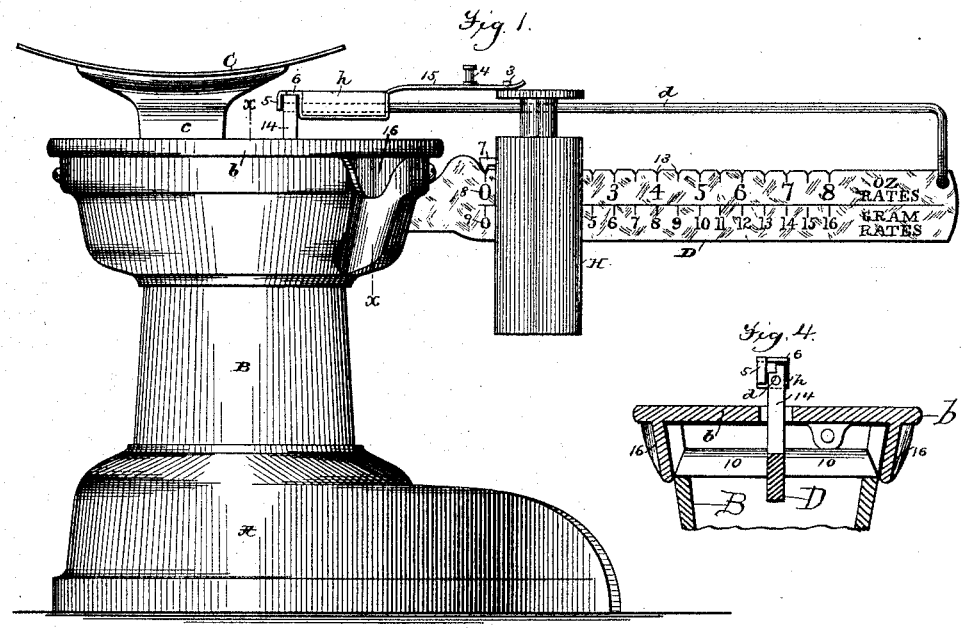
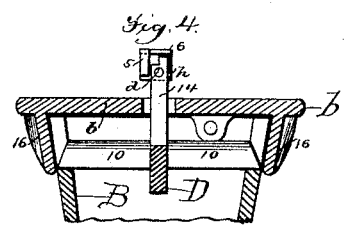
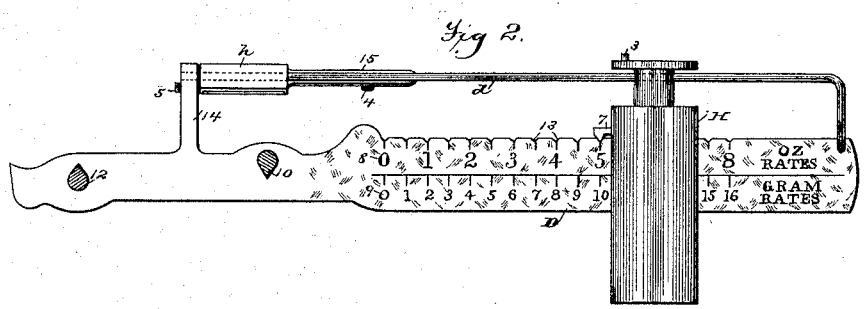
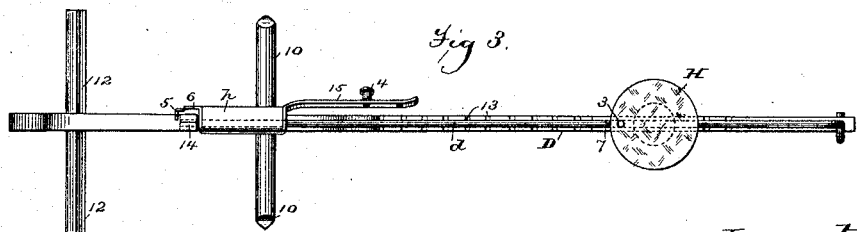
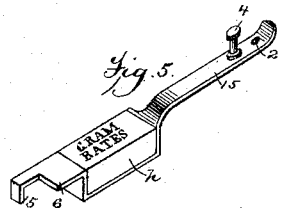

UNITED STATES PATENT OFFICE.

WILLIAM W. REYNOLDS, OF RUTLAND, VERMONT.

SCALE FOR WEIGHING ACCORDING TO TWO STANDARDS.

SPECIFICATION forming part of Letters Patent No. 351,528, dated October 26, 1886.

Application filed May 26, 1886. Serial No. 203,269. (No model.)

*To all whom it may concern:*

Be it known that I, WILLIAM W. REYNOLDS, a citizen of the United States, residing at Rutland, county of Rutland, and State of Vermont, have invented certain new and useful Improvements in Scales, fully described and represented in the following specification and the accompanying drawings, forming a part of the same.

This invention relates to a scale which is adapted for weighing according to two standards—as, for example, avoirdupois and metric—it being the object of the invention to provide a scale which is capacitated to weigh according to two standards by the use of a single beam, poise, and graduation.

The invention relates particularly to the construction of the weigh-beam and the parts which co-operate directly therewith.

The invention, while applicable to all classes of scales in which a weigh-beam is employed, is especially applicable to postal scales, which are used for weighing letters and other mail matter.

As a full understanding of the invention can be best imparted by a detailed description of a scale embodying the same, all further preliminary description will be omitted and a full description given, reference being had to the accompanying drawings, in which—

Figure 1 is a side elevation of a postal scale embodying the invention. Fig. 2 is a side view of the beam and the parts which co-operate therewith detached from the other parts, the poise being shown in a different position. Fig. 3 is a plan view of the parts shown in Fig. 2. Fig. 4 is an irregular cross-section taken on the line $x\ x$ of Fig. 1, and Fig. 5 is a perspective view, upon an enlarged scale, of the auxiliary weight or poise, which will be hereinafter referred to.

Referring to said figures, it is to be understood that the base A, standard B, and platform C of the scale are of substantially the usual form and construction. The standard is made hollow, and is provided at its top with the usual bearings for the knife-edge fulcrum-pivots 10 of the beam D.

The platform C is balanced by the usual rod extending downward in the hollow standard B, and its base $c$ is provided with the usual bearings, which rest upon the knife-edge pivots 12 of the beam D.

The standard B is provided with a removable cap-plate, $b$, which fits over the top of the standard, and covers and protects the knife-edge pivots and their bearings. This cap-plate is provided with downward projections or ears 16, which project past the ends of the knife-edge pivots 10, and serve, as shown in Fig. 4, to prevent these pivots from shifting on their bearings, so as to move the beam laterally.

The beam D is provided with the usual scale, 13, which, as shown in the present case, is graduated for the avoirdupois and metric standards, and with two rows of figures, 8 9, which indicate the weight in ounces and grams respectively. The beam D is also provided between the pivots 10 12 with an upwardly-projecting standard, 14, which supports the inner end of a rod, $d$, which extends outward in line with and is bent downward and secured to the outer end of the beam. The beam D is also provided with the usual poise, H, which slides freely on the beam and the rod $k$, and, as shown in the present case, is provided with the usual catch, 7, which engages with the notches in the beam. The rod $d$ is provided with a small auxiliary weight or poise, $h$, which is arranged to slide freely on the rod, and is provided with an outwardly-extending spring-arm, 15, having an opening, 2, which is arranged to receive a small stud, 3, projecting from the top of the poise H. The auxiliary weight $h$ is also provided at its opposite end with an extension, 6, which, when the auxiliary weight $h$ is at the limit of its inward movement, lies above the standard 14, as shown in Figs. 1 and 4.

The extension 6 is provided at one side with a downwardly-turned lip, 5, which, when the weight $h$ is in the position shown in Figs. 1 and 4, will pass to one side of the standard 14. The weight $h$ is so proportioned that when it is in this position its center of gravity will be exactly over the fulcrum-pivots 10 of the beam D, and it will therefore not affect the weighing. The opening in the weight $h$, through which the rod $d$ passes, is located at one side of the center of gravity of the weight, so that whenever it is released it will turn on the rod and fall to one side, as shown in Figs. 2 and 3, and thereby carry the lip 5 inward behind the standard 14, so as to hold the weight in that position. One side of the top of the standard 14 is cut away, as shown in Fig. 4, so as to permit the extension 6 to turn down to that side of the standard, but is left full at the other side, so as to engage with the extension 6, and prevent it and the weight $h$ from turning in the opposite direction. When the weight $h$ is turned to one side and fastened in that position, as just described, the end of the spring-arm 15 will, when the poise H is moved to the position shown in Fig. 1, enter the circumferential recess near the top of the poise, and therefore not prevent the poise from being moved inward to the end of the scale on the beam D. It is also to be remarked that the rod $d$ serves as a stop to arrest the poise H and prevent it from being moved off the end of the beam D.

The manner of using the scale thus constructed and organized is as follows: When it is desired to ascertain the weight of an article—a package of mail-matter, for example—in ounces, the spring-arm 15 will be raised, for which purpose it may be provided with a small knob, as 4, so as to disengage it from the stud 3, and the auxiliary weight $h$ will be slid along the rod $d$ to the limit of its inward movement, and allowed to turn over to one side, and be secured in that position by the lip 5, as shown in Figs. 2 and 3. It will be observed that when the weight $h$ is in this position its center of gravity is in the same plane vertically with the fulcrum-pivots 10 of the beam, and as a consequence the weight has no effect. The poise H will then be moved along the beam D until the beam is balanced on the pivots 10. The weight of the article in ounces will then be indicated by the figures in the row 8. If it should be desired to ascertain the weight of the article in grams, the auxiliary weight $h$ will be turned up to the position shown in Fig. 1, and its arm 15 hooked to the stud 3. As long as the poise H and the weight $h$ remain in the position shown in Fig. 1, the center of gravity of the weight $h$ will be in line with the pivots 10, and the scale will be balanced; but the weight of the poise will be increased by the addition of the weight $h$, so that it will, as it is moved along the beam D, raise a greater weight upon the platform C, and thus the graduation upon the beam will indicate greater units of weight. By then moving the poise, which will then carry with it the auxiliary weight $h$ until the beam is balanced, the weight of the article in grams will be indicated by the figures in the row 9.

This invention, as before stated, is especially useful in postal scales; but its utility is not limited to such scales. Scales of larger sizes may be made upon the same plan. It is also to be remarked that the beam D, instead of being graduated to indicate weight according to the avoirdupois and metric standards, may be graduated to indicate weight according to any other standards—as, for example, apothecaries and troy weights—or it may be graduated to indicate weight in bushels, the figures in the row 8 indicating bushels of wheat, and the figures in the row 9 bushels of corn, oats, or coal, for example.

Although preferable, it is not necessary that the spring-arm 15 should be carried by the auxiliary weight $h$. This arm may be carried by the poise H, the stud 3 being upon the weight $h$.

What I claim is—

1. The combination, with the hollow standard B, and the beam D, having the knife-edge pivots 10 resting on bearings on said standard, of the cap-plate $b$, covering said standard, and having ears 16, forming end bearings for the pivots 10, substantially as described.

2. The combination, with the beam D and the poise H, of the auxiliary weight $h$, provided with connections by which it can be attached to and detached from the poise H, the weight $h$ being so arranged that when in its innermost position its center of gravity will be in line vertically with the fulcrum-pivots of the beam, substantially as described.

3. The combination, with the beam D and the poise H, of the auxiliary weight $h$, arranged to move on a guide or rod attached to the beam D, and provided with connections by which it can be attached to and detached from the poise H, the weight $h$ being so arranged that when in its innermost position its center of gravity will be in the same plane vertically with the fulcrum-pivots of the beam, substantially as described.

4. The combination, with the beam D and the poise H, of the auxiliary weight $h$, arranged to slide upon the rod $d$, located above the beam D, and provided with connections by which it can be attached to and detached from the poise H, the weight $h$ being so arranged that when in its innermost position its center of gravity will be in the same plane vertically with the fulcrum-pivots of the beam, substantially as described.

5. The combination, with the beam D and poise H, of the auxiliary weight $h$, arranged to move upon a guide or rod attached to the beam D, and provided with connections by which it can be attached to and detached from the poise H, and also with a lip, 5, by which it can be secured in its innermost position, said weight being so arranged that when in its innermost position it will be in the same plane vertically with the fulcrum-pivots of the beam, substantially as described.

In testimony whereof I have hereunto set my hand in the presence of two subscribing witnesses.

WM. W. REYNOLDS.

Witnesses:
CHAS. W. MUSSEY,
GEO. D. TUTTLE.